N. KING, Sr.
RESILIENT WHEEL.
APPLICATION FILED NOV. 30, 1914.
1,137,063. Patented Apr. 27, 1915.
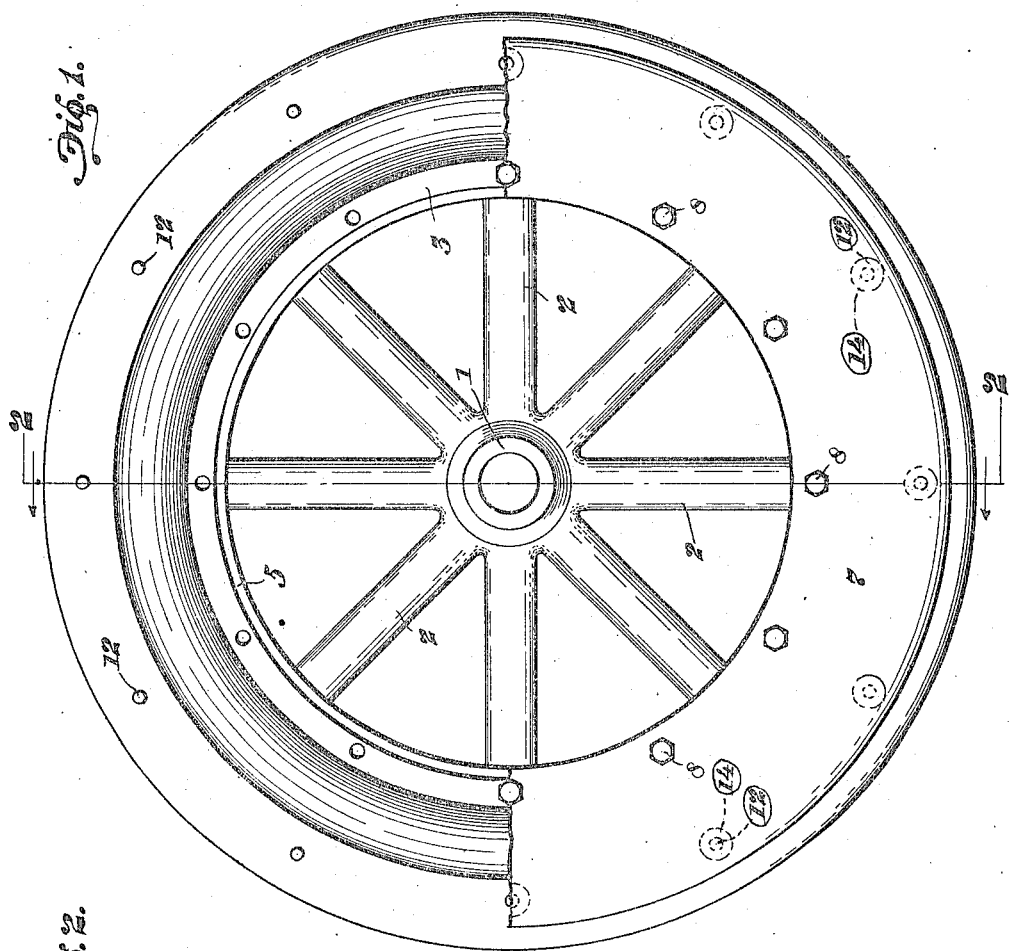
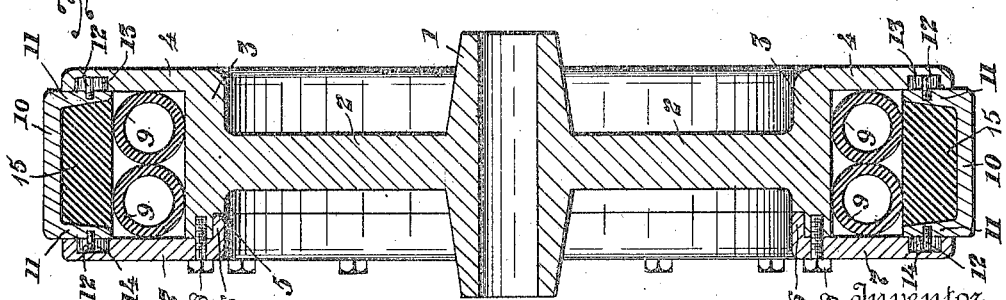

UNITED STATES PATENT OFFICE.

NORMAN KING, SR., OF CANTON, OHIO.

RESILIENT WHEEL.

1,137,063.  Specification of Letters Patent.  Patented Apr. 27, 1915.

Application filed November 30, 1914. Serial No. 874,635.

*To all whom it may concern:*

Be it known that I, NORMAN KING, Sr., a citizen of the United States, residing at Canton, in the county of Stark and State of Ohio, have invented a new and useful Resilient Wheel, of which the following is a specification.

My invention relates to resilient wheels and more particularly to a wheel of this character in which pneumatic tires are used in combination with a cushion member and a metallic tire.

The objects of my invention are to provide a wheel of the character referred to in which pneumatic tires are used in combination with a cushion member around the periphery of which is provided a metallic tire.

A further object is to provide a wheel of the character mentioned, which will afford resiliency and at the same time be puncture proof and durable.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim without departing from the spirit or sacrificing any of the advantages of the invention.

In the drawings: Figure 1 is a side elevation of a wheel constructed in accordance with my invention, parts being broken away for the purpose of illustration. Fig. 2 is a section on the line 2—2 of Fig. 1.

Similar numerals of reference indicate corresponding parts throughout the several figures of the drawing.

The hub 1, spokes 2 and felly 3 are substantially of the usual construction with the exception that the felly is provided upon one side with a peripheral annular flange 4 and is provided upon its other side with an annular shoulder 5, which is engaged by the inturned annular flange 6 of the annular plate 7, said plate being connected to the felly by a series of bolts 8.

A plurality of pneumatic tubes 9, preferably two as shown, are located around the felly. The tire 10 is preferably formed of spring steel and is of channel form being provided with two inwardly projecting annular flanges 11, which are preferably slightly tapered as shown. Each of the flanges 11 is provided with a series of studs 12, preferably screw threaded as shown and adapted to have a slight movement in the elongated pockets 13 and 14 which are formed in the flanges 4 and 7 respectively. Located within the channel of the tire 10 is a cushion member formed of rubber, leather, fiber or similar slightly resilient material, the cushion 15 resting upon the pneumatic tubes 9.

It will be noticed that the pockets 13 and 14 in the flange 4 and plate 7 are closed for the purpose of preventing any dirt or grit from working into the interior of the tire.

As the wheel rotates, the weight of the vehicle carried thereby will cause a slight compression of the tubes 9, the resilient construction of the tire 10 allowing a slight compression of the tire at the point where it contacts with the surface of the earth, the studs 12 at the lowest point of the wheel will thus have a slight reciprocating movement vertically within the pockets 13 and 14.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:

In a wheel of the character described, a felly provided with an integral annular, outstanding flange upon one side, a removable annular, outstanding flange attached upon the other side of said felly, each of said flanges provided with inwardly disposed elongated pockets, a plurality of pneumatic tubes located around said felly and between said flanges, an annular metallic tire provided with inwardly disposed annular flanges located around said pneumatic tubes and between said outstanding annular flanges, pins carried by said tire and located within said elongated pockets and an annular cushion member located between the inwardly disposed annular flanges of said tire.

In testimony that I claim the above, I have hereunto subscribed my name in the presence of two witnesses.

NORMAN KING, Sr.

Witnesses:
J. H. BISHOP,
SYLVIA BORON.